(12) United States Patent
Lamarre et al.

(10) Patent No.: US 12,326,092 B2
(45) Date of Patent: Jun. 10, 2025

(54) ENGINE EXHAUST REVERSE FLOW PREVENTION

(71) Applicant: PRATT & WHITNEY CANADA CORP., Longueuil (CA)

(72) Inventors: Sylvain Lamarre, Boucherville (CA); Kashif Mohammed, Brossard (CA); John Sgouromitis, Dorval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/318,183

(22) Filed: May 16, 2023

(65) Prior Publication Data

US 2024/0384667 A1 Nov. 21, 2024

(51) Int. Cl.
*F01D 25/12* (2006.01)
*F01D 21/00* (2006.01)

(52) U.S. Cl.
CPC ............. *F01D 25/12* (2013.01); *F01D 21/00* (2013.01); *F05D 2260/232* (2013.01)

(58) Field of Classification Search
CPC ...... F01D 25/12; F01D 21/00; F05D 2260/52; F05D 2260/605; F02C 7/14; F02C 7/18; F02C 7/185; F02K 1/38; F02K 1/46; F02K 1/78; F02K 3/115
See application file for complete search history.

(56) References Cited

U.S. PATENT DOCUMENTS

| | | | |
|---|---|---|---|
| 3,032,986 A | 5/1962 | Wright | |
| 3,344,602 A | 10/1967 | Omri | |
| 4,203,566 A | 5/1980 | Lord | |
| 4,770,201 A | 9/1988 | Zakai | |
| 5,113,649 A | 5/1992 | Siedlecki | |
| 5,168,709 A | 12/1992 | Bombard | |
| 7,040,576 B2 | 5/2006 | Noiseux et al. | |
| 8,434,692 B2 | 5/2013 | Scott | |
| 8,485,222 B2 | 7/2013 | Restivo | |
| 8,701,307 B2 | 4/2014 | Slack et al. | |
| 8,833,053 B2 | 9/2014 | Chir | |
| 9,267,390 B2 | 2/2016 | Lo | |

(Continued)

FOREIGN PATENT DOCUMENTS

RU 2545261 6/2015

*Primary Examiner* — Brian P Wolcott
*Assistant Examiner* — John S Hunter, Jr.
(74) *Attorney, Agent, or Firm* — Norton Rose Fulbright Canada LLP (57) ABSTRACT

An aircraft engine has an exhaust duct receiving an engine gas flow and a heat exchanger duct having a wall extending from an inlet receiving a cooling air flow to an outlet connected to the exhaust duct. A heat exchanger is disposed in the heat exchanger duct between the inlet and outlet. A diverted airflow pathway in the heat exchanger duct includes first and second plates extending inwardly in the heat exchanger duct from first and second positions on an inner surface of the wall to plate distal ends, the plate distal ends extending past one another in a direction transverse to the wall. A valve in the wall selectively fluidly connects the heat exchanger duct to an evacuation location and is movable between closed and open positions during operating and shutdown conditions of the engine to fluidly disconnect and connect the heat exchanger duct to the evacuation location.

19 Claims, 5 Drawing Sheets

(56) References Cited

U.S. PATENT DOCUMENTS

| | | |
|---|---|---|
| 9,903,274 B2 | 2/2018 | Diaz |
| 9,976,484 B2 * | 5/2018 | Sawyers-Abbott ....... F02C 7/25 |
| 10,563,936 B2 | 2/2020 | Tajiri |
| 10,590,799 B2 | 3/2020 | Zebian |
| 10,739,086 B2 | 8/2020 | Aouizerate |
| 11,060,462 B2 | 7/2021 | Fert et al. |
| 2006/0284015 A1 | 12/2006 | Noiseux |
| 2007/0245739 A1 * | 10/2007 | Stretton .................. F02C 7/185 |
| | | 60/728 |
| 2009/0175718 A1 | 7/2009 | Diaz |
| 2011/0030337 A1 | 2/2011 | Mons |
| 2012/0168115 A1 | 7/2012 | Raimarckers et al. |
| 2014/0145008 A1 | 5/2014 | Webster |
| 2018/0135467 A1 | 5/2018 | Zhang et al. |
| 2019/0072035 A1 | 3/2019 | Peace et al. |
| 2019/0145317 A1 | 5/2019 | Holt |
| 2020/0011247 A1 | 1/2020 | Schwarz et al. |

* cited by examiner

ENGINE EXHAUST REVERSE FLOW PREVENTION

TECHNICAL FIELD

The disclosure relates generally to aircraft engines, and more particularly, to exhaust flow management in aircraft engines.

BACKGROUND

In some aircraft engines, a duct for an air-cooled heat exchanger has its outlet coupled to the engine's exhaust duct. As such, the core gas path flowing through the exhaust duct can draw ambient air through the heat exchanger duct. When the engine shuts down and the airflow through the main engine gas path stops, remaining hot exhaust gas in the exhaust duct may vent outwards through the heat exchanger duct. If the heat exchanger includes temperature-sensitive materials such as aluminum, it may be susceptible to temperature-related damage due to the hot exhaust gas flowing therethrough. Improvements are therefore desired.

SUMMARY

In one aspect, there is provided an aircraft engine having a central longitudinal axis, comprising: an exhaust duct receiving a gas flow from the aircraft engine; and a heat exchanger duct having an air inlet receiving a flow of cooling air, an air outlet fluidly connected to the exhaust duct, and a duct wall extending from the air inlet to the air outlet; an air-cooled heat exchanger disposed in the heat exchanger duct between the air inlet and the air outlet; a diverted airflow pathway in the heat exchanger duct between the air-cooled heat exchanger and the air outlet, the diverted airflow pathway including a first plate extending inwardly in the heat exchanger duct from a first position on an inner surface of the duct wall to a first plate distal end, and a second plate extending inwardly in the heat exchanger duct from a second position on the inner surface of the duct wall opposite the first position to a second plate distal end, the first plate distal end and the second plate distal end extending past one another in a direction transverse to the duct wall; and a valve in the duct wall of the heat exchanger duct between the first plate and the second plate, the valve selectively fluidly connecting the heat exchanger duct to an evacuation location, the valve being movable between a closed position during an operating condition of the aircraft engine to fluidly disconnect the heat exchanger duct to the evacuation location, and an open position during a shutdown condition of the aircraft engine to fluidly connect the heat exchanger duct to the evacuation location.

In another aspect, there is provided a heat exchanger duct assembly for an aircraft engine having an engine central longitudinal axis, comprising: a heat exchanger duct having a duct wall extending from an air inlet to an air outlet, the air inlet connectable to a source of pressurized air, the air outlet fluidly connectable to an exhaust duct of the aircraft engine; an air-cooled heat exchanger disposed between the air inlet and the air outlet; a chicane disposed in the heat exchanger duct between the air-cooled heat exchanger and the air outlet; and an evacuation valve in the chicane, the evacuation valve selectively openable for venting exhaust gas from the chicane.

In a further aspect, there is provided a method of operating an aircraft engine, comprising: operating the aircraft engine in a powered mode that includes passing a gas through a heat exchanger towards an exhaust duct of the aircraft engine; and transitioning the aircraft engine from the powered mode into shut down, the transitioning including preventing exhaust gas from flowing from the exhaust duct towards the heat exchanger by navigating the exhaust gas through a diverted airflow pathway downstream of the heat exchanger, and evacuating the exhaust gas via an evacuation valve disposed fluidly between the heat exchanger and the exhaust duct.

BRIEF DESCRIPTION OF THE DRAWINGS

Reference is now made to the accompanying figures in which.

DETAILED DESCRIPTION

Figure 1:
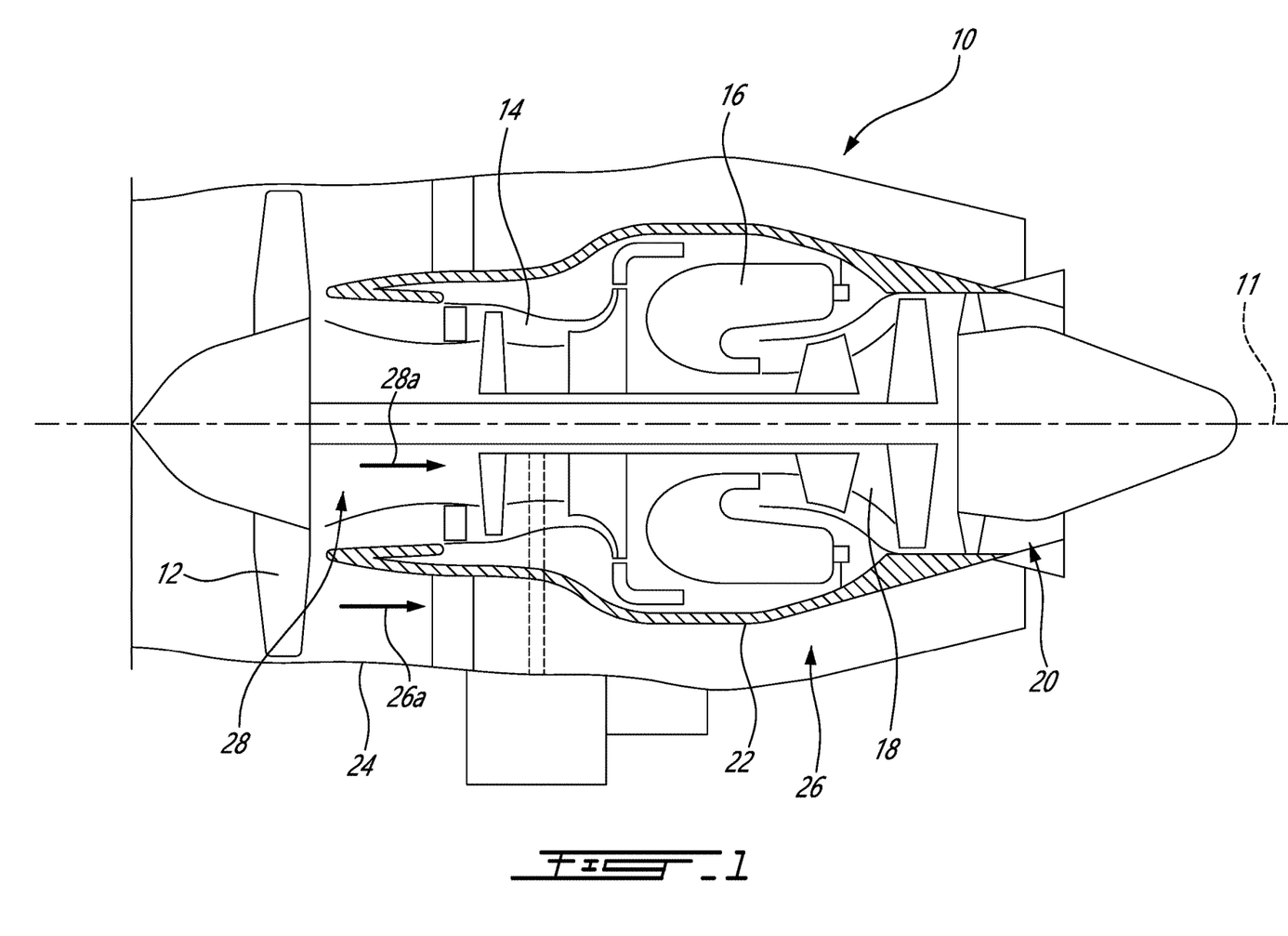
FIG. 1 is a schematic cross sectional view of a gas turbine engine.

FIG. 1 illustrates a gas turbine engine 10 of a type preferably provided for use in subsonic flight, generally comprising in serial flow communication, along central longitudinal axis 11, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Engine 10 further includes an exhaust section 20 where hot combustion gases are expelled. While FIG. 1 depicts engine 10 as a turbofan-type gas turbine engine, the present disclosure may relate to other types of aircraft engines, such as turboprop engines, turboshaft engines, as well as hybrid-electric engines.

The gas turbine engine 10 includes a first, inner casing 22 which encloses the turbo machinery of the engine, and a second, outer casing 24 extending outwardly of the first casing 22 such as to define an annular bypass passage 26 therebetween, also referred to as a bypass duct or an annular outer passage. The air propelled by the fan 12 is split into a first portion which flows around the first casing 22 within the bypass passage 26, and a second portion which flows through a main gas path 28, also referred to as a core passage, which is defined within the first casing 22 and allows the gas flow to circulate through the multistage compressor 14, combustor 16 and turbine section 18 as described above. A core gas flow 28a is said to flow through the main gas path 28 (also referred to as the core gas path), while a bypass gas flow 26a is said to flow through the bypass passage 26.

Figure 2A:
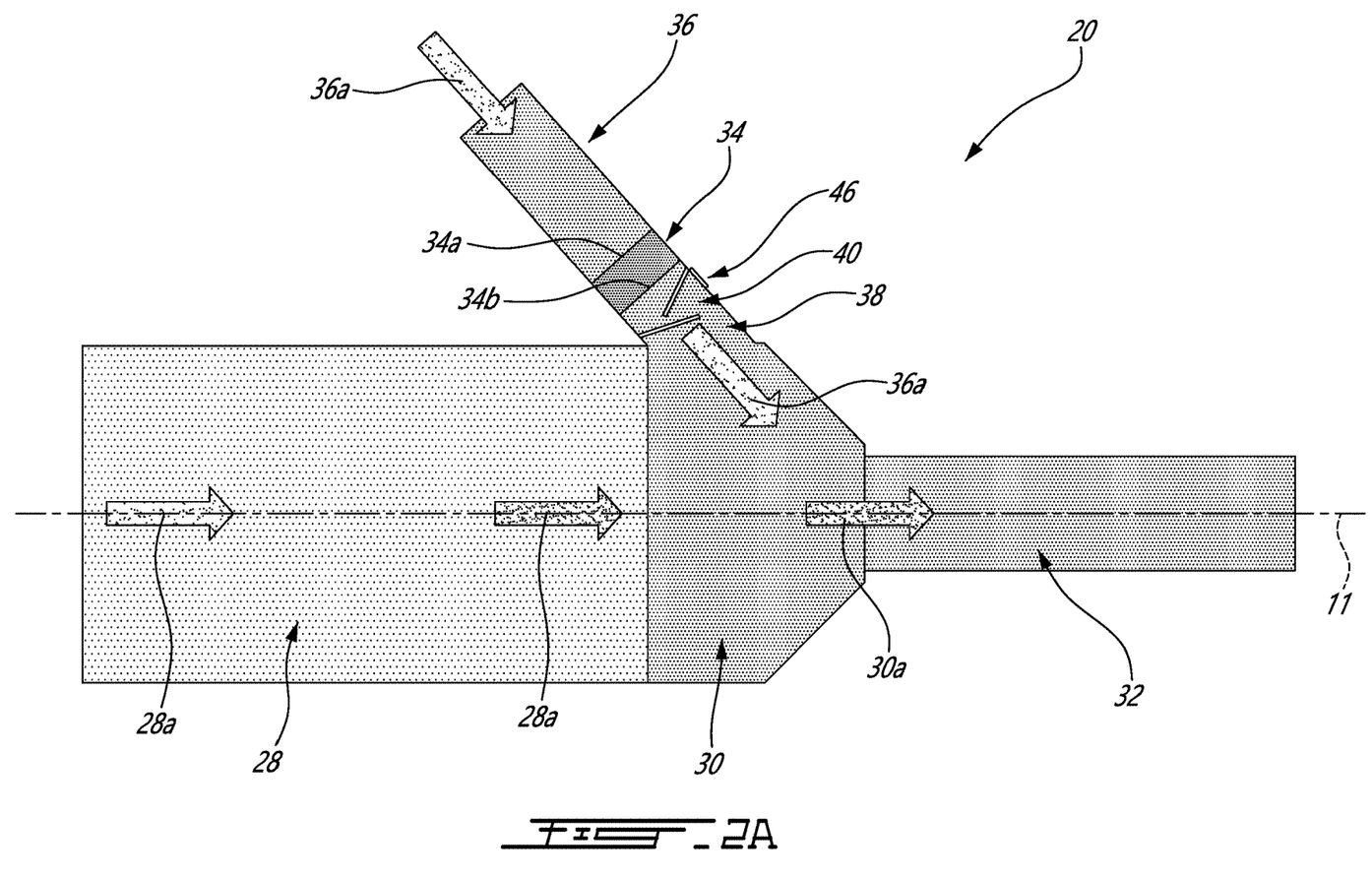
FIG. 2A is a schematic cross sectional view of an exhaust section of the engine of FIG. 1 in a first engine operational mode.
Figure 2B:
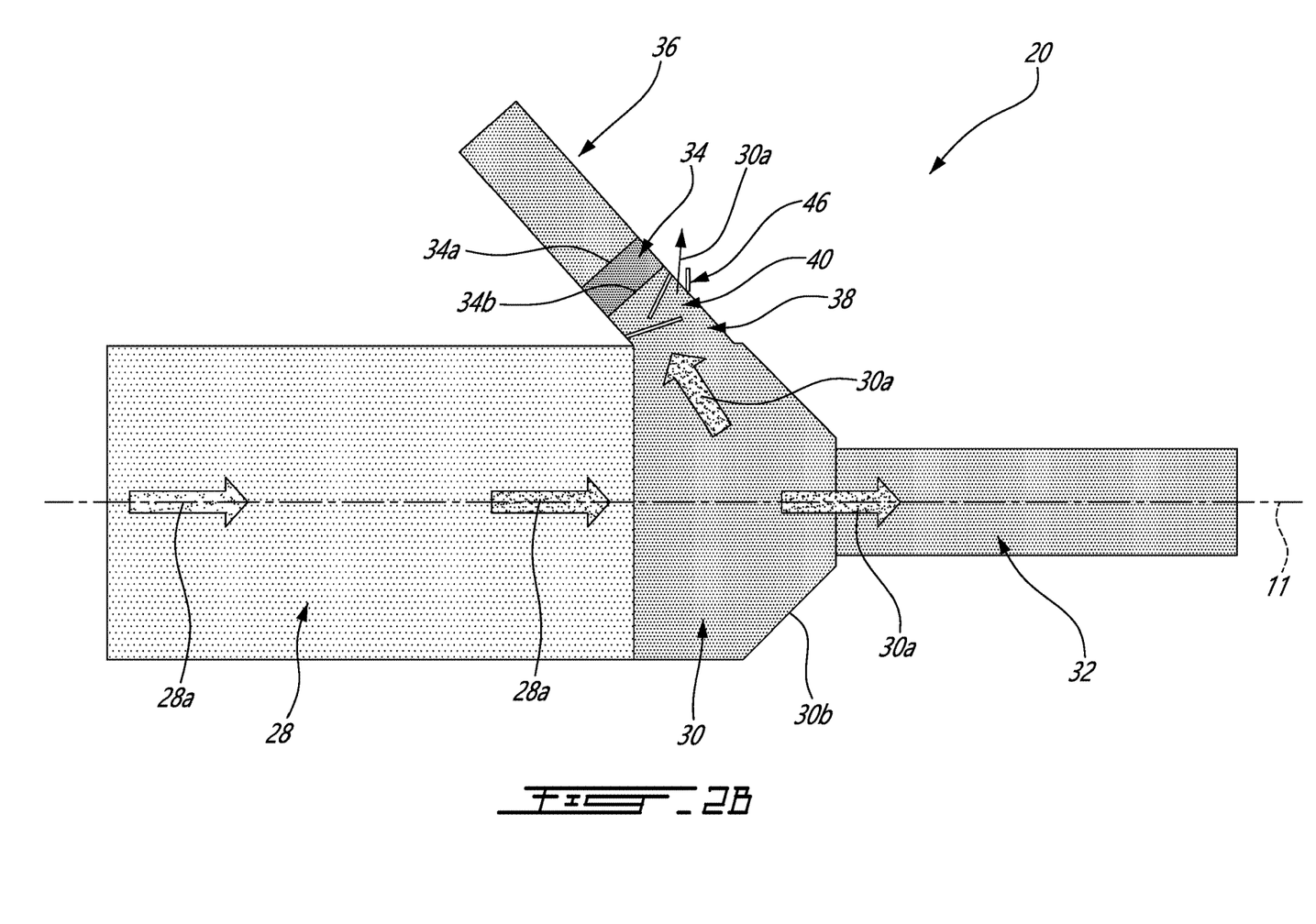
FIG. 2B is a schematic cross sectional view of an exhaust section of the engine of FIG. 1 in a second engine operational mode.

Referring additionally to FIGS. 2A-2B, at the exhaust section 20 at the aft end of the engine 10, the core gas flow 28a and the bypass gas flow 26a are exhausted from the engine 10 through an exhaust duct 30 and an external exhaust 32. In the depicted embodiment, engine 10 further includes an air-cooled heat exchanger 34 disposed adjacent the exhaust duct 30 and in fluid communication therewith. In an embodiment, the air-cooled heat exchanger 34 is an air-cooled oil cooler, in which warm engine oil is operable to transfer heat to the cool air flowing therethrough. Other types of air-cooled heat exchangers may be contemplated. In particular, the air-cooled heat exchanger 34 receives cooling airflow 36a via an air inlet duct 36, and exhausts the cooling airflow 36a into the exhaust duct 30 via an air outlet duct 38. The outlet duct 38 includes one or more walls 38a, for instance first duct wall 38a1 and second duct wall 38a2 (see FIGS. 3A-3B). In the shown case, the outlet duct 38 has a rectangular cross-section and the first and second duct walls 38a1, 38a2 are opposite one another, although other arrangements may be contemplated. For instance, the outlet duct 38 may have a cylindrical wall 38a. In some cases, the first and second duct walls 38a1, 38a2 may be disposed in parallel with one another. The air-cooled heat exchanger 34 includes an inlet 34a receiving the cooling airflow 36a from the inlet duct 36 and an outlet 34b for expelling the cooling airflow 36a through the outlet duct 38 towards the exhaust duct 30. The inlet duct 36 and outlet duct 38 may collectively be referred to as a heat exchanger duct. The cross-sectional shape of the heat exchanger duct may vary, for instance the cross-sectional shape may be circular, square, rectangular or another shape.

Figure 3A:
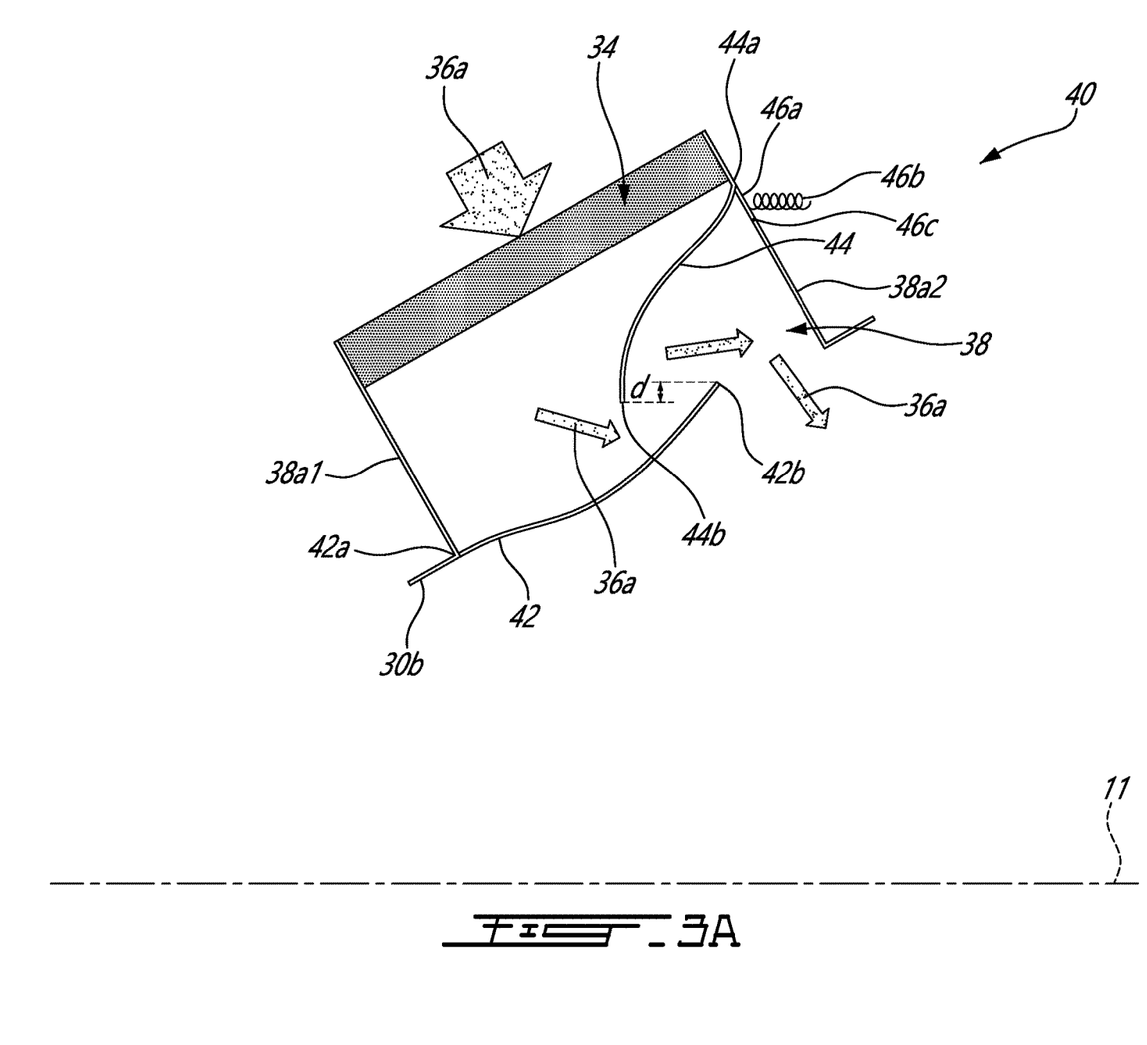
FIG. 3A is a schematic cross sectional view of a heat exchanger duct for the exhaust section of FIGS. 2A-2B in the first engine operational mode.
Figure 3B:
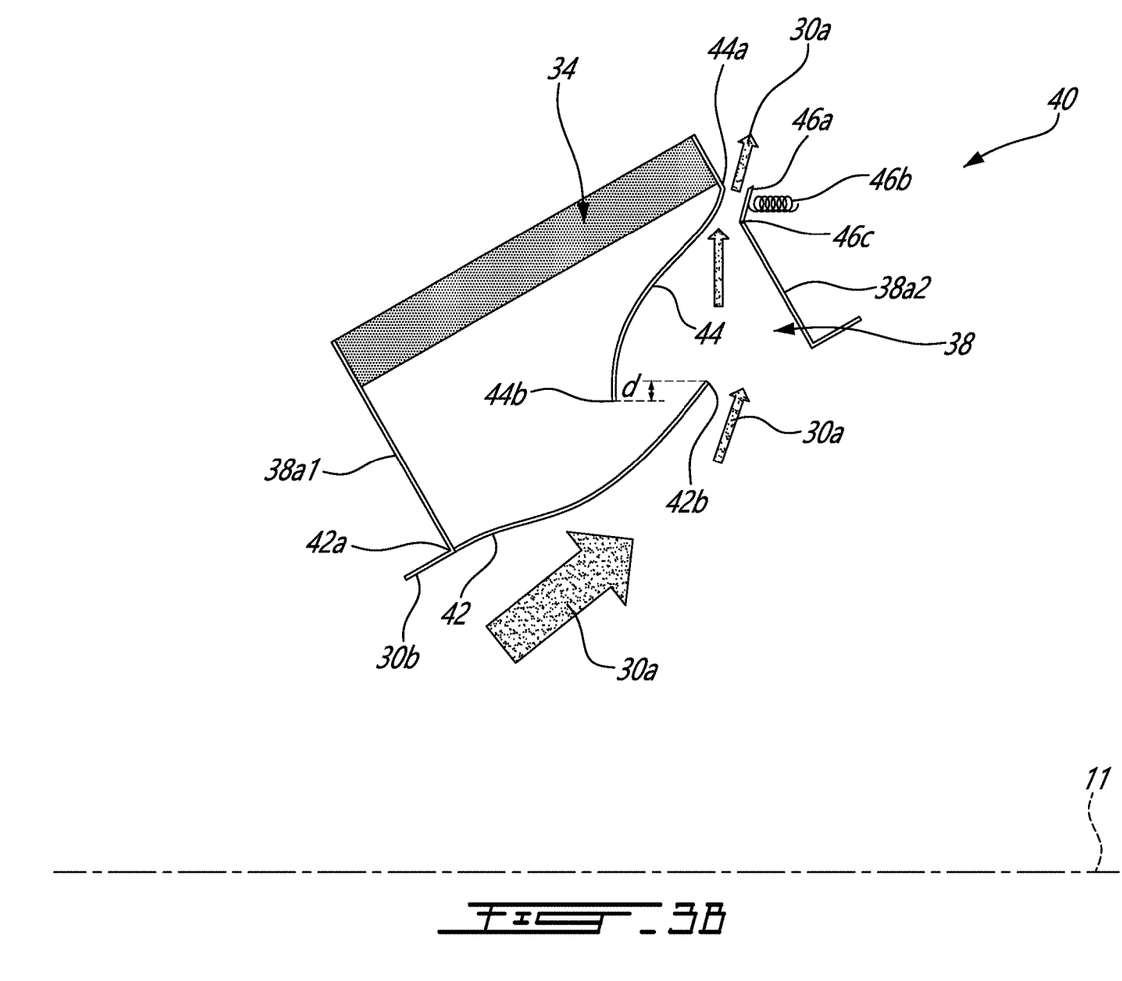
FIG. 3B is a schematic cross sectional view of a heat exchanger duct for the exhaust section of FIGS. 2A-2B in the second engine operational mode.

Referring additionally to FIGS. 3A-3B, according to an embodiment of the present disclosure, the heat exchanger duct includes a diverted airflow pathway 40, also referred to as a diverted air path or a chicane. The heat exchanger duct, as well as the components found therewithin, may therefore be referred to as a heat exchanger duct assembly. The diverted airflow pathway 40 is illustratively disposed in the outlet duct 38 portion of the heat exchanger duct, downstream of the air-cooled heat exchanger 34 and upstream of the exhaust duct 30 (see FIGS. 2A-2B). The diverted airflow pathway 40 includes a first plate 42 extending into the outlet duct 38 from a first position on an inner surface of the duct wall 38a, illustratively the first duct wall 38a1, and a second plate 44 extending into the outlet duct 38 from a second position on the inner surface of the duct wall 38a opposite the first position, illustratively the second duct wall 38a2. The diverted airflow pathway 40 further includes an evacuation valve 46 for selectively evacuating hot exhaust gas 30a to an evacuation location, as will be discussed in further detail below.

The depicted diverted airflow pathway 40 is arranged so that, in an operating condition of the engine 10 (shown in FIGS. 2A and 3A), cooling air 36a is allowed to flow from the air-cooled exchanger 34, through the outlet duct 38, and into the exhaust duct 30 (while maintaining the valve 46 in a closed position), and so that in a shutdown condition of the engine 10 (shown in FIGS. 2B and 3B), the hot exhaust flow 30a is prevented from flowing upstream in the air outlet 38 towards the air-cooled heat exchanger 34, and instead is evacuated via the valve 46 (now in an open position) to an evacuation location. As will be discussed in further detail below, the valve 46 is movable between the open and closed positions or configurations based on an alteration of an operational condition or state of the engine 10. Stated differently, the valve 46 may assume its closed position in an engine operational condition (i.e., when then engine 10 is running), and may assume its open position in an engine shutdown state. As will be discussed in further detail below, the position of the valve 46 (and thus the operating condition of the engine 10) may correspond to the presence or absence of the cooling airflow 36a flowing through the air-cooled heat exchanger 34 towards the exhaust duct 30. The pressence or absence of the flowing cooling airflow 36a, and thus the air pressure of the cooling airflow 36a, may cause the valve 46 to open or close. Other engine airflows may directly or indirectly affect the open or closed positions of the valve 46, as will be discussed in further detail below. The diverted airflow pathway 40 may therefore be referred to as a passive means for directing airflow, as its functionality is based on surrounding airflow(s). Advantageously, the arrangement of the diverted airflow pathway 40 (i.e., the plates 42, 44) and the selective opening of the valve 46 may prevent hot gasses (i.e., exhaust flow 30a) from flowing upstream into the outlet duct 38 and through the air-cooled heat exchanger 34 (also referred to as a soak-back condition), which may be susceptible to temperature-related damage such as melting or burning.

FIG. 2A illustratively depicts the engine 10 in an operational or running state or condition. Stated differently, the core gas flow 28a flows through the main gas path 28, i.e., through the compressor section 14, combustor 16 and turbine section 18 towards the exhaust section 20 for evacuation from the engine 10, illustratively via external exhaust 32. As the core gas flow 28a passes through the exhaust duct 30, an eductor effect may occur, whereby a cooling airflow 36a is drawn from a cooling airflow source (not shown), through the inlet duct 36 and through the air-cooled heat exchanger 34 before entering the exhaust duct 30 via the outlet duct 38. The cooling airflow source may be, for instance, the bypass gas flow 26a in the bypass passage 26, or ambient air source surrounding the engine 10. In some cases, in addition to or instead of flowing via an eductor effect, the cooling airflow 36a may be forcibly driven through the air-cooled heat exchanger 34 towards the exhaust duct 30. The flow of the cooling airflow 36a exiting the air-cooled heat exchanger 34 may be at a flow rate above a predetermined flow rate required to maintain the valve 46 in its closed position, as will be discussed in further detail below. In addition, the diverted airflow pathway 40 is arranged so that the cooling airflow 36a is operable to flow from the air-cooled heat exchanger 34 towards the exhaust duct 30, as will be discussed in further detail below. As such, while the engine 10 is in its operational state and the cooling airflow 36a is flowing through the inlet duct 36, the air-cooled heat exchanger 34 and the outlet duct 38 towards the exhaust duct 30, the valve 46 may be maintained in its closed position.

FIG. 2B illustratively depicts the engine 10 in a non-operational or non-running state or condition, for instance after an engine shutdown procedure or condition. Stated differently, the core gas flow 28a is no longer actively flowing through the main gas path 28. Remaining or lingering core gas flow 28a, and exhaust flow 30a, may remain to be evacuated. As the core gas flow 28a and exhaust flow 30a are no longer actively flowing, there may no longer be a strong enough flow to create an eductor effect for drawing the cooling airflow 36a through the air-cooled heat exchanger 34. In addition, in the depicted embodiment, the outlet duct 38 is disposed above, i.e., in an upward direction from, the exhaust duct 30 relative to the longitudinal axis 11. As such, the hot exhaust flow 30a may attempt to evacuate from the exhaust duct 30 upwardly via the outlet duct 38 instead of or in addition to via the external exhaust 32. In other cases, the outlet duct 38 may be disposed adjacent or alongside the exhaust duct 30 relative to the longitudinal axis 11. In such a configuration, the adjacent outlet duct 38 may still provide a possible passageway for the hot exhaust flow 30a to evacuate from the exhaust duct 30. In some embodiments, the air-cooled heat exchanger 34 may be a temperature-sensitive component, i.e., it includes one or more materials (e.g., aluminum) that are susceptible to damage (e.g., burning or melting) when exposed to excess heat. As such, the decreased flow rate of the flowing cooling airflow 36a, indicative of the engine 10 entering a shutdown phase, and/or the presence of the hot exhaust flow 30a in the outlet duct 38, may result in the valve 46 transitioning to its open position, thereby allowing the hot exhaust flow 30a to be evacuated to the evacuation location, and preventing the hot exhaust flow 30a from traveling upstream through the outlet duct 38 towards the air-cooled heat exchanger 34. The evacuation location may be a safe location or zone in which the hot exhaust flow 30a may be directed to, for instance, a source of ambient air in or adjacent to the engine 10. Heat-related damage to the air-cooled heat exchanger 34 due to exposure to the hot exhaust flow 30a may thus be prevented.

In an exemplary embodiment, the core gas flow 28a exiting the main gas path 28 and the exhaust flow may be at temperatures of around 1000 degrees Fahrenheit. If such gases were to flow upstream into the outlet duct 38, they may melt, burn or otherwise damage one or more components of the air-cooled heat exchanger 34. In addition, the various tubes and fittings joining the air-cooled heat exchanger 34 to the heat exchanger duct may be susceptible to high temperature-related damage. The arrangement of the diverted airflow pathway 40, as well as the opening of the valve 46 at a shutdown condition of the engine 10, may prevent such damage.

Referring to FIGS. 3A-3B, the first plate 42 extends from a first plate proximal end 42a at the first duct wall 38a1 to a first plate distal end 42b within the outlet duct 38. Similarly, the second plate 44 extends from a second plate proximal end 44a at the second duct wall 38a2 to a second plate distal end 44b within the outlet duct 38. The lengths and shapes of the first plate 42 and the second plate 44 may vary. In the shown embodiment, the first plate 42 and the second plate 44 each extend from respective duct walls 38a in a curved manner. In other embodiments, one or both of the first plate 42 and the second plate 44 may extend from respective duct walls 38a in a straight manner. Other shapes for the first plate 42 and the second plate 44 may be contemplated.

In the shown embodiment, the first plate distal end 42b and the second plate distal end 44b extend past one another in a direction extending between the first duct wall 38a1 and the second duct wall 38a2. Stated differently, the first plate 42 and the second plate 44 overlap one another such that no gap exists in the direction extending between the first duct wall 38a1 and the second duct wall 38a2. Plates 42, 44 may thus be referred to as overlapping plates. As such, in the shutdown condition of the engine 10 (se FIG. 3B), the hot exhaust flow 30b rising through the outlet duct 38 is prevented from flowing towards the air-cooled heat exchanger 34 by way of the arrangement of the first plate 42 and second plate 44. In particular, the hot temperature of the hot exhaust flow 30b forces the hot exhaust flow 30b to rise in the outlet duct 38, but the overlap between the first plate 42 and the second plate 44 prevents or blocks the hot exhaust flow 30b from rising towards the air-cooled heat exchanger 34. Rather, the hot exhaust flow 30b is evacuated, via the evacuation valve 46, to the evacuation location. On the contrary, in the operating condition of the engine (see FIG. 3A), the arrangement of the first plate 42 and the second plate 44 allows the cooling airflow 36a to navigate the diverted airflow pathway 40 and flow towards the exhaust duct 30.

In the shown embodiment, but not necessarily the case in all embodiments, the second plate distal end 44b is disposed closer to the longitudinal axis 11 (not shown to scale in FIGS. 3A-3B) than the first plate distal end 42b. This difference in proximity to the longitudinal axis 11 is represented by distance d in FIGS. 3A-3B. Stated differently, the highest point of the first plate 42 (i.e., first plate distal end 42b) is positioned above (i.e., further away from the longitudinal axis 11) the lowest point of the second plate 44 (i.e., second plate distal end 44b). This arrangement, along with the overlapping nature of the plates 42, 44, may further prevent the hot exhaust flow 30a from flowing upstream in the outlet duct 38 towards the air-cooled heat exchanger 34.

In the shown embodiment, but not necessarily the case in all embodiments, the evacuation valve 46 is a spring-activated door comprising a door 46a, a spring 46b, and a hinge 46c. In the shown case, the hinge 46c is disposed at the downstream end of the door 46a, although the opposite arrangement (i.e., the hinge 46c disposed at the upstream end of the door 46a) may be contemplated. In the shown case, the valve 46 is disposed immediately downstream of the second plate 44 along the second duct wall 38a2, although other valve locations along the second duct wall 38a2 may be contemplated. A force generated on the door 46a by the spring 46b may bias the door 46a open, as shown in FIG. 3B in the shutdown condition of the engine 10, thereby allowing the hot exhaust flow 30a to evacuate the outlet duct 38 towards the evacuation location. In the operating condition of the engine 10, the flow of the cooling airflow 36a may generate a force against the door 46a that is opposite to and greater than the force of the spring 46b, thereby closing the door 46a. The valve 46 may thus be referred to as a passive valve, as it is biased between its open and closed positions based on the presence or absence of certain airflows in the outlet duct 38.

In other cases, the spring 46b may be omitted, and the hinged door 46a may bias open or closed solely based on the flow of the cooling airflow 36a (biasing the door 46a to the closed position due to negative pressure) or the flow of the hot exhaust flow 30a (biasing the door 46a to the open position due to positive pressure). Other valve types may be contemplated, for instance a thermally activated valve operable to bias towards the valve towards the closed position below a predetermined temperature associated with the operating condition of the engine 10 (e.g., indicative of the presence of the cooling airflow 36a in the outlet duct 38) and towards the open position above the predetermined temperature (e.g., indicative of the presence of hot exhaust flow in the outlet duct 38). Yet other valve types may be contemplated, such as mechanically-activated (e.g., solenoid) valves.

In accordance with the present disclosure, an exemplary method is shown for operating an aircraft engine 10. The aircraft engine 10 is operated in a powered mode that includes passing a gas through a heat exchanger 34 towards an exhaust duct 30 of the aircraft engine 10. The aircraft engine is transitioned from the powered mode into shut down, the transitioning including preventing exhaust gas 30a from flowing from the exhaust duct 30 towards the heat exchanger 34 by navigating the exhaust gas 30a through a diverted airflow pathway 40, and evacuating the exhaust gas 30a via an evacuation valve 46 disposed fluidly between the heat exchanger 34 and the exhaust duct 30, illustratively between the first plate 42 and the second plate 44.

It can be appreciated from the foregoing that at least some embodiments have a passive, airflow-based system for preventing hot exhaust gasses from traveling upstream a heat exchanger duct, thereby allowing temperature-sensitive components of the heat exchanger to be protected at engine shutdown.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine having a central longitudinal axis, comprising:
    an exhaust duct receiving a gas flow from the aircraft engine; and
    a heat exchanger duct having an air inlet receiving a flow of cooling air, an air outlet fluidly connected to the exhaust duct, and a duct wall extending from the air inlet to the air outlet;
    an air-cooled heat exchanger disposed in the heat exchanger duct between the air inlet and the air outlet;
    a diverted airflow pathway in the heat exchanger duct between the air-cooled heat exchanger and the air outlet, the diverted airflow pathway including a first plate extending inwardly in the heat exchanger duct from a first position on an inner surface of the duct wall to a first plate distal end, and a second plate extending inwardly in the heat exchanger duct from a second position on the inner surface of the duct wall opposite the first position to a second plate distal end, the first plate distal end and the second plate distal end extending past one another in a direction transverse to the duct wall; and
    a valve in the duct wall of the heat exchanger duct between the first plate and the second plate, the valve selectively fluidly connecting the heat exchanger duct to an evacuation location, the valve being movable between a closed position during an operating condition of the aircraft engine to fluidly disconnect the heat exchanger duct to the evacuation location, and an open position during a shutdown condition of the aircraft engine to fluidly connect the heat exchanger duct to the evacuation location.

2. The aircraft engine as defined in claim 1, wherein the second plate distal end is disposed closer to the central longitudinal axis than the first plate distal end.

3. The aircraft engine as defined in claim 2, wherein the second plate is disposed closer to the air-cooled heat exchanger in the heat exchanger duct than the first plate.

4. The aircraft engine as defined in claim 1, wherein the valve includes a spring having a spring operatively connected to a hinged door, the spring having a spring force biasing the hinged door into the open position, and wherein the flow of cooling air is at a first pressure during the operating condition of the aircraft engine and a second pressure during the shutdown condition of the aircraft engine, a first force generated on the hinged door by the flow of cooling air at the first pressure being greater than a second force generated on the hinged door by the flow of cooling air at the second pressure, the first and second forces opposing the spring force, the spring force being greater than the second force and less than the first force.

5. The aircraft engine as defined in claim 1, wherein the valve is a thermally activated valve, the thermally activated valve operable to bias towards the closed position below a predetermined temperature associated with the operating condition of the aircraft engine and towards the open position above the predetermined temperature.

6. The aircraft engine as defined in claim 1, wherein the duct wall has a first and a second side, the second side opposite to the first side, the first plate extending from the first side, the second plate extending from the second side, and wherein the valve is disposed on the second side of the duct wall immediately downstream of the second plate relative to the flow of cooling air in the heat exchanger duct.

7. The aircraft engine as defined in claim 6, wherein the heat exchanger duct has a rectangular cross section.

8. The aircraft engine as defined in claim 1, wherein the air outlet is disposed at a higher elevation than the exhaust duct relative to the central longitudinal axis.

9. The aircraft engine as defined in claim 1, wherein the evacuation location is an ambient air source adjacent the aircraft engine.

10. A heat exchanger duct assembly for an aircraft engine having an engine central longitudinal axis, comprising:
    a heat exchanger duct having a duct wall extending from an air inlet to an air outlet, the air inlet connectable to a source of pressurized air, the air outlet fluidly connectable to an exhaust duct of the aircraft engine;
    an air-cooled heat exchanger disposed between the air inlet and the air outlet;
    a chicane disposed in the heat exchanger duct between the air-cooled heat exchanger and the air outlet, wherein the chicane defines a diverted airflow pathway having a first plate extending from a first position on an inner surface of the duct wall to a first plate distal end and a second plate extending from a second position on the inner surface of the duct wall opposite the first position to a second plate distal end, the second plate distal end extending past the first plate distal end to hinder the exhaust gas in the exhaust duct of the aircraft engine from flowing upstream towards the air-cooled heat exchanger at a shutdown condition of the aircraft engine, and wherein the second plate distal end is disposed closer to the air outlet than the first plate distal end; and
    an evacuation valve in the chicane, the evacuation valve selectively openable for venting exhaust gas from the chicane.

11. The heat exchanger duct as defined in claim 10, wherein the second plate is disposed closer to the air-cooled heat exchanger in the heat exchanger duct than the first plate.

12. The heat exchanger duct assembly as defined in claim 10, wherein the duct wall has a first and a second side, the second side opposite to the first side, the first plate extending from the first side, the second plate extending from the second side, and wherein the evacuation valve is disposed on the second side adjacent to the second plate.

13. The heat exchanger duct assembly as defined in claim 12, wherein the first side of the duct wall is parallel to the second side.

14. The heat exchanger duct assembly as defined in claim 10, wherein the evacuation valve includes a spring having a spring operatively connected to a hinged door, the spring having a spring force biasing the hinged door into an open position, and wherein the pressurized air is at a first pressure during an operating condition of the aircraft engine and a second pressure during a shutdown condition of the aircraft engine, a first force generated on the hinged door by the pressurized air at the first pressure being greater than a second force generated on the hinged door by the pressurized air at the second pressure, the first and second forces opposing the spring force, the spring force being greater than the second force and less than the first force.

15. The heat exchanger duct assembly as defined in claim 10, wherein the evacuation valve is a thermally activated valve, the thermally activated valve operable to bias closed below a predetermined temperature associated with an operating condition of the aircraft engine and to bias open above the predetermined temperature.

16. The heat exchanger duct assembly as defined in claim 10, wherein the air outlet is disposable at a higher elevation than the exhaust duct relative to engine central longitudinal axis.

17. The heat exchanger duct assembly as defined in claim 10, wherein the evacuation valve is operable to selectively evacuate the exhaust gas to an ambient air source adjacent the aircraft engine at a shutdown condition of the aircraft engine.

18. A method of operating an aircraft engine, comprising: the aircraft engine comprising:
    an exhaust duct receiving a gas flow from the aircraft engine; and
    a heat exchanger duct having an air inlet receiving a flow of cooling air, an air outlet fluidly connected to the exhaust duct, and a duct wall extending from the air inlet to the air outlet;
    an air-cooled heat exchanger disposed in the heat exchanger duct between the air inlet and the air outlet;
    a diverted airflow pathway in the heat exchanger duct between the air-cooled heat exchanger and the air outlet, the diverted airflow pathway including a first plate extending inwardly in the heat exchanger duct from a first position on an inner surface of the duct wall to a first plate distal end, and a second plate extending inwardly in the heat exchanger duct from a second position on the inner surface of the duct wall opposite the first position to a second plate distal end, the first plate distal end and the second plate distal end extending past one another in a direction transverse to the duct wall; and
    a valve in the duct wall of the heat exchanger duct between the first plate and the second plate, the valve selectively fluidly connecting the heat exchanger duct to an evacuation location, the valve being movable between a closed position during an operating condition of the aircraft engine to fluidly disconnect the heat exchanger duct to the evacuation location, and an open position during a shutdown condition of the aircraft engine to fluidly connect the heat exchanger duct to the evacuation location;
the method comprising:
operating the aircraft engine in a powered mode that includes passing a gas through the heat exchanger towards the exhaust duct of the aircraft engine; and
transitioning the aircraft engine from the powered mode into shut down, the transitioning including preventing exhaust gas from flowing from the exhaust duct towards the heat exchanger by navigating the exhaust gas through the diverted airflow pathway downstream of the heat exchanger, and evacuating the exhaust gas via the valve disposed fluidly between the heat exchanger and the exhaust duct.

19. The method as defined in claim 18, wherein navigating the exhaust gas through the diverted airflow pathway includes navigating the exhaust gas through a pair of overlapping plates downstream of the heat exchanger.

* * * * *